(12) United States Patent
Yang

(10) Patent No.: US 10,665,844 B2
(45) Date of Patent: May 26, 2020

(54) LITHIUM METAL ELECTRODE AND ITS RELATED LITHIUM METAL BATTERY

(71) Applicants: Prologium Technology Co., Ltd., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 166 days.

(21) Appl. No.: 15/728,662

(22) Filed: Oct. 10, 2017

(65) Prior Publication Data

US 2018/0102522 A1  Apr. 12, 2018

Related U.S. Application Data

(60) Provisional application No. 62/406,998, filed on Oct. 12, 2016.

(51) Int. Cl.

| | |
|---|---|
| *H01M 2/16* | (2006.01) |
| *H01M 4/62* | (2006.01) |
| *H01M 4/134* | (2010.01) |
| *H01M 4/38* | (2006.01) |
| *H01M 10/0525* | (2010.01) |
| *H01M 10/052* | (2010.01) |
| *H01M 4/02* | (2006.01) |

(52) U.S. Cl.
CPC ......... *H01M 2/168* (2013.01); *H01M 2/1666* (2013.01); *H01M 2/1686* (2013.01); *H01M 4/134* (2013.01); *H01M 4/382* (2013.01); *H01M 4/62* (2013.01); *H01M 4/628* (2013.01); *H01M 10/0525* (2013.01); *H01M 10/052* (2013.01); *H01M 2004/027* (2013.01)

(58) Field of Classification Search
CPC .. H01M 2/1666; H01M 2/168; H01M 2/1686; H01M 4/134; H01M 4/628
USPC ........................................................ 429/144
See application file for complete search history.

(56) References Cited

U.S. PATENT DOCUMENTS

| | | | |
|---|---|---|---|
| 2012/0015228 A1* | 1/2012 | Yoon ..................... | H01M 2/162 429/144 |
| 2013/0224631 A1* | 8/2013 | Gronwald .............. | H01G 11/52 429/509 |

(Continued)

*Primary Examiner* — James M Erwin
(74) *Attorney, Agent, or Firm* — Rabin & Berdo, P.C.

(57) ABSTRACT

A lithium metal electrode and a lithium metal battery that includes the lithium metal electrode are disclosed. The lithium metal electrode includes a current collector; a lithium metal layer on exposed portions of the current collector; an ionic diffusion layer on the lithium metal layer; and a porous electrical insulation layer. The porous electrical insulation layer includes an insulation layer disposed on the current collector and having at least one through hole that completely surrounds the lithium metal layer and the ionic diffusion layer; and an inhibition layer disposed on the insulation layer and having a plurality of second through holes. Lithium dendrites will mostly plate in the at least one through hole of the insulation layer and will not plate upwards due to the inhibition layer. Hence, the lithium dendrites will not penetrate through the electrical insulator so that safety of the lithium metal battery is greatly improved.

19 Claims, 3 Drawing Sheets

(56) References Cited

U.S. PATENT DOCUMENTS

| | | | | |
|---|---|---|---|---|
| 2015/0147656 A1* | 5/2015 | Kogetsu | ............ | H01M 2/26 429/231.4 |
| 2015/0194654 A1* | 7/2015 | Oh | ............ | H01M 2/1686 361/679.55 |
| 2015/0228951 A1* | 8/2015 | Yu | ............ | H01M 2/145 429/144 |

* cited by examiner

LITHIUM METAL ELECTRODE AND ITS RELATED LITHIUM METAL BATTERY

This Non-provisional application claims priority under 35 U.S.C. § 119(a) on Patent Application No. 62/406,998 filed in United States on Oct. 12, 2016, the entire contents of which are hereby incorporated by reference.

BACKGROUND

1. Technical Field

The present invention is related to an electrode, in particular to a lithium metal electrode and its related lithium metal battery.

2. Description of Related Art

Comparing to the current non-lithium battery system, the lithium battery system has advantages of high operation voltage (up to 3.6V), high energy density (up to 120 Wh/kg), light weight, longer cycle life, friendly to the environment and so on. According to the researching history of the lithium battery system, the earliest lithium battery developed is the rechargeable lithium metal battery which has pretty high energy density but meanwhile has serious issues of stability and safety because of the high chemical reacting ability to the electrolyte. Considering the safety issue of the lithium metal battery system, the developments of the rechargeable lithium battery gradually focus on the rechargeable lithium-alloy battery system and the rechargeable lithium-ion battery system.

As for the performances of the battery system, except for the safety requirement, it is crucial to ensure that the capacity of the battery system is enough for supporting the operation duration of the device. Consequently, the capacity of the battery system becomes the important developing issue again. In the past, the development of the lithium metal battery system was suspended due to its safety issue. Comparing to the lithium-ion and the lithium polymer systems, the energy density of the lithium metal system is much higher than other systems. However, because the lithium metal has high chemical activity, an extreme oxidation-reduction reaction occurs if the lithium metal is not stored or operated under the proper condition. Practically, the lithium metal battery system is quite suitable for the current smart electrical device only if the issues of safety, processing and storage of the lithium metal can be conquered.

However, the electrolyte of the lithium-ion battery system is the liquid comprising organic solvents so that the evaporation, ignition problems occur inevitably. Besides, the electrolyte leaks due to the poor sealing of the battery and this causes the safety issue. Recently, in order to ensure the safety, the rechargeable lithium polymer battery system is developed. The original organic solvents are replaced by the polymer electrolyte to improve the safety of the lithium battery system.

Accordingly, a lithium metal electrode is provided to overcome the above problems.

SUMMARY OF THE INVENTION

It is an objective of this invention to provide a lithium metal electrode and its related lithium metal battery. The insulation layer of the porous electrical insulation layer of the lithium metal electrode can provide a specific region for lithium dendrite plating.

It is an objective of this invention to provide a lithium metal electrode and its related lithium metal battery. The inhibition layer of the porous electrical insulation layer efficiently inhibits the height of plating of the lithium dendrite during charging due to the structural strength of the inhibition layer. The lithium dendrite will mainly plate horizontally so that the specific regions formed via the insulation layer are highly efficiently used for lithium dendrite plating. Hence, the lithium dendrite will not penetrate through the electrical insulator to avoid inner shorting of the battery. Meanwhile, the lithium dendrite plate toward the radiation direction instead of toward the vertical direction so that the thickness of the battery will not verify extremely.

It is an objective of this invention to provide a lithium metal electrode and its related lithium metal battery. The ionic diffusion layer of the porous electrical insulation layer is porous and is made of particles and/or fibers. The lithium dendrite plates and strips inside the pores of the ionic diffusion layer. During plating, the lithium dendrite attaches to the particles and/or the fibers of the ionic diffusion layer to enhance the strength of the solid electrolyte interface (SEI). Comparing to the SEI's thickness (around 10~50 nanometers), the volume change (15~20 microns) of plating/stripping of the lithium dendrite is too violent and the SEI will be seriously damaged during plating and/or stripping of the lithium dendrite without providing the supporting from the ionic diffusion layer. The ionic diffusion layer having particles and/or the fibers can provide supporting for the SEI to decrease the capacity loss of the battery and even, under certain conditions, can react with the reaction of forming the SEI.

It is an objective of this invention to provide a lithium metal electrode and its related lithium metal battery. The surfaces and/or the pores created via the particles and/or fibers of the ionic diffusion layer can serve as the diversions for the liquid and/or gel electrolyte so that the plating/stripping of the lithium dendrite can be more efficient for continuous interface of the electrolyte. Also, the interface between the lithium dendrite and the electrolyte can be kept complete so that the resistance of the interface can be reduced and the uniformity of the lithium dendrite plating can be revealed via controlling the over-voltage of the interface.

The present invention discloses a lithium metal electrode which comprises a current collector, a porous electrical insulation layer, at least an ionic diffusion layer and a lithium metal layer, wherein the porous electrical insulation layer comprises an insulation layer and an inhibition layer.

The present invention discloses a lithium metal battery which comprises a lithium metal electrode, a cathode electrode, an electrical insulator and a sealing frame, wherein the lithium metal electrode comprises a current collector, a porous electrical insulation layer, at least an ionic diffusion layer and a lithium metal layer. The porous electrical insulation layer comprises an insulation layer and an inhibition layer.

According to the lithium metal electrode and its related lithium metal battery, the lithium dendrite will only plate within the specific region defined via the porous electrical insulation layer and the ionic diffusion layer so that the lithium dendrite will not penetrate through the electrical insulator of the battery. The inner shorting of the battery will not occur and the safety of the battery can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

DETAILED DESCRIPTION

Figure 1:
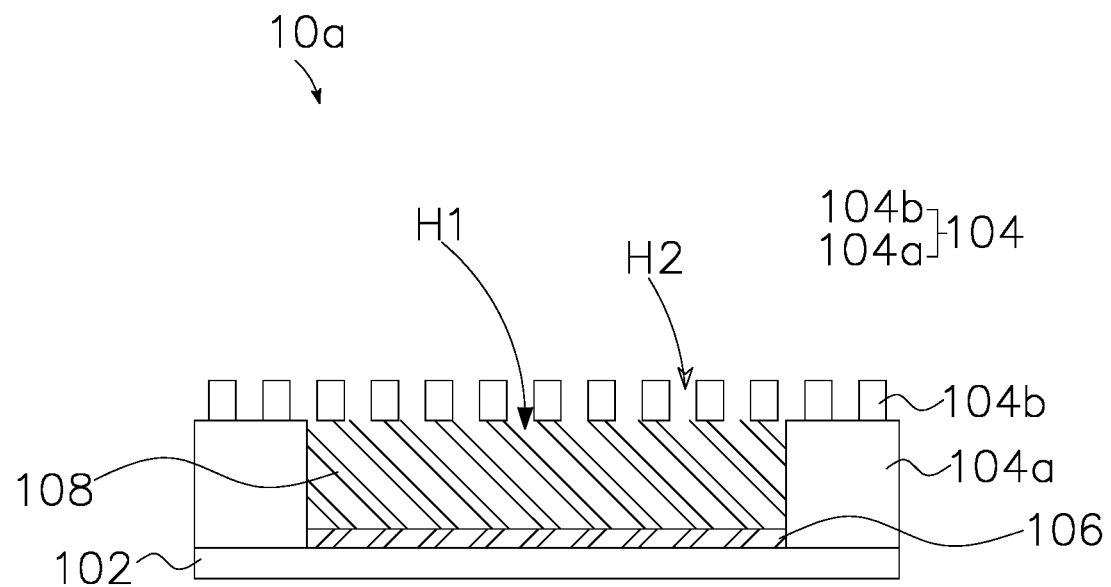
FIG. 1 illustrates a cross-section diagram of the lithium metal electrode of the present invention.
Figure 2:
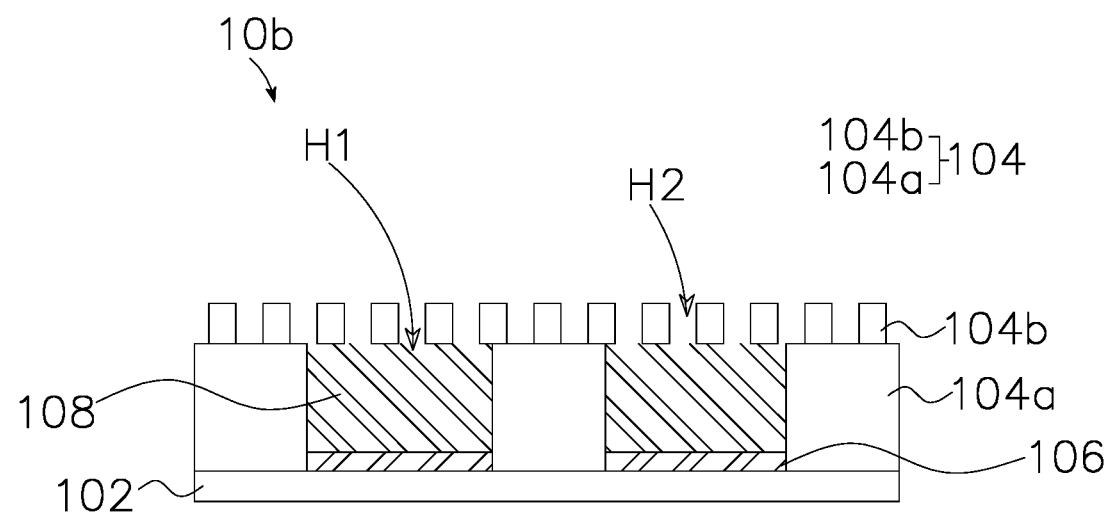
FIG. 2 illustrates a cross-section diagram of the lithium metal electrode of the present invention.

As illustrated in FIG. 1, a lithium metal electrode 10a of the present invention comprises a current collector 102, a porous electrical insulation layer 104, at least an ionic diffusion layer 108 and a lithium metal layer 106. The electrical insulation layer 104 comprises an insulation layer 104a and an inhibition layer 104b. The electrical insulation layer 104 is disposed on a surface of the current collector 102. The insulation layer 104a has at least a first through hole H1. Some parts of the surface of the current collector 102 are exposed according to the first through hole H1 and the lithium metal layer 106 are disposed on the exposed surface of the current collector 102. Above the lithium metal layer 106, the ionic diffusion layer 108 is disposed in the first through hole H1 and is adjacent to the lithium metal layer 106. The ionic diffusion layer 108 may directly or indirectly contact with the lithium metal layer 106 or, under certain conditions, the ionic diffusion layer 108 even does not contact with the lithium metal layer 106 at all. The ionic diffusion layer 108 can be disposed in the first through hole H1 completely or partially disposed in the first through hole H1. The ionic diffusion layer 108 is positioned entirely within the insulation layer 104a and does not penetrate into the inhibition layer 104b. That is, the ionic diffusion layer 108 does not position into the second through holes H2 of the inhibition layer 104b. In some cases, the insulation layer 104a may have more than one first through holes H1. As shown in FIG. 2, the lithium metal layer 106 and the ionic diffusion layer 108 can be disposed as illustrated above.

The material of the current collector 102 can be metal or any other conductive materials, such as copper, nickel, steel or any combinations thereof. The current collector 102 can be solid structure or porous structure. Based on the requirement of capacity and design, the thickness of the lithium metal layer 106 is ranging from 0.3~5 microns. The outer surface of the porous electrical insulation layer 104, which comprises the insulation layer 104a and the inhibition layer 104b, is made of the non-conductive material. As the insulation layer 104a and/or the inhibition layer 104b are/is a single-layer structure, the material of the insulation layer 104a and/or the inhibition layer 104b is insulated, such as insulation polymer material, insulation ceramic material, insulation glass material, insulation glass fiber material and any combinations thereof. The insulation polymer material includes polyimide, polyethylene terephthalate, polyurethane, polyacrylate, epoxy or silicone. The insulation glass fiber material includes FR4-class epoxy glass fiber material. As the insulation layer 104a and/or the inhibition layer 104b are/is a multi-layer structure, besides the material mentioned above, the insulation layer 104a and/or the inhibition layer 104b are/is made of the electrical insulated material, any material having electrical insulated coating or any material completely covered via electrical insulated material.

Additionally, the ionic diffusion layer 108 is porous and can be made of the polymer material, ceramic material, glass material, fiber material and any combinations thereof. The pores of the ionic diffusion layer 108 may be made via the particle stacking and/or fiber crossing. The particles include ceramic particles, polymer particles and/or glass particles. The fibers include polymer fibers and/or glass fibers. The surface of the ionic diffusion layer 108 may further be treated to have a charged surface carrying anions and/or cations. For instance, the charged surface with cations of the ionic diffusion layer 108 can reduce the electric double layer effect so that the polarization of lithium ion migration during charging. The charged surface with anions of the ionic diffusion layer 108 can be helpful for the distribution of the lithium ions.

Figure 3:
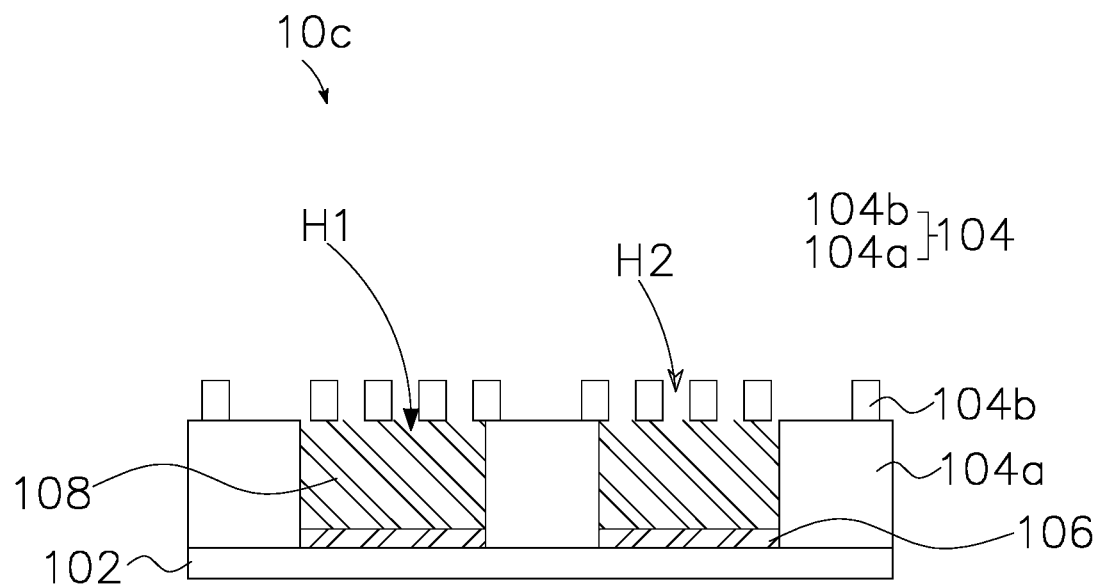
FIG. 3 illustrates a cross-section diagram of the lithium metal electrode of the present invention.

(0019) Referring to the FIG. 2, the diameters of the first through holes H1 of the lithium metal electrode 10b are uniform and the diameters of the second through holes H2 of the lithium metal electrode 10b are uniform. The diameters of the first through holes H1 of the lithium metal electrode 10b are not uniform and the diameters of the second through holes H2 of the lithium metal electrode 10b are not uniform, as illustrated in FIG. 3. That is, the sizes of the first through holes H1 may be various; the sizes of the second through holes H2 may be various. Practically, the insulation layer 104a having the uniform-sized first through holes H1 may be coupled with the inhibition layer 104b having the non-uniform-sized second through holes H2 or with the inhibition layer 104b having the uniform-sized second through holes H2. Similarly, the insulation layer 104a having the non-uniform-sized first through holes H1 may be coupled with the inhibition layer 104b having the non-uniform-sized second through holes H2 or with the inhibition layer 104b having the uniform-sized second through holes H2. However, no matter what kind of combination mentioned above, the diameter of the second through hole H2 must be smaller than the first through hole H1. For the insulation layer having only one first through hole H1, the size of the first through hole H1 is not larger than the active-reaction region of the electrode. For the insulation layer 104a having more than one first through holes H1, the diameter of the first through hole Hl is not less than 50 microns no matter these first through holes H1 having the same size or not. Because the size of the lithium dendrite is larger than 1 micron, the diameters of the uniform-sized second through holes H2 and the non-uniform-sized second through holes H2 are less than 1 micron.

The aperture ratio of the insulation layer 104a is ranging from 40%~99.5%, wherein the high aperture ratio is revealed in the case of the lithium metal electrode (not shown) having narrow border. The aperture ratio of the inhibition layer 104b is ranging from 25%~80%. The thickness of the insulation layer 104a is ranging from 15~40 microns and the thickness of the inhibition layer 104b is ranging from 1~25 microns. The total thickness of the porous electrical insulation 104 is ranging from 16~65 microns.

Figure 4:
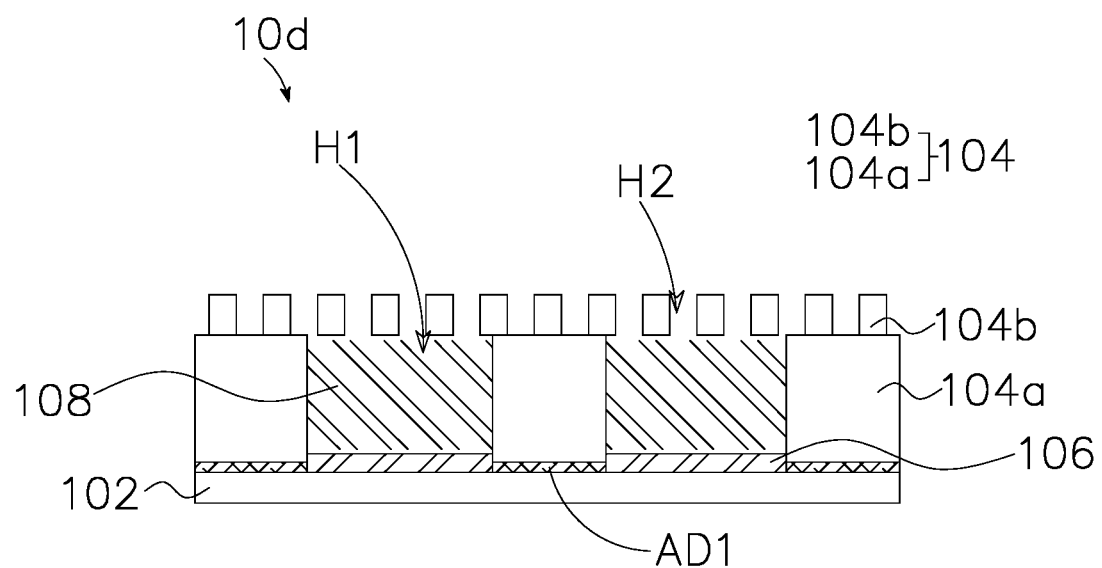
FIG. 4 illustrates a cross-section diagram of the lithium metal electrode of the present invention.
Figure 5:
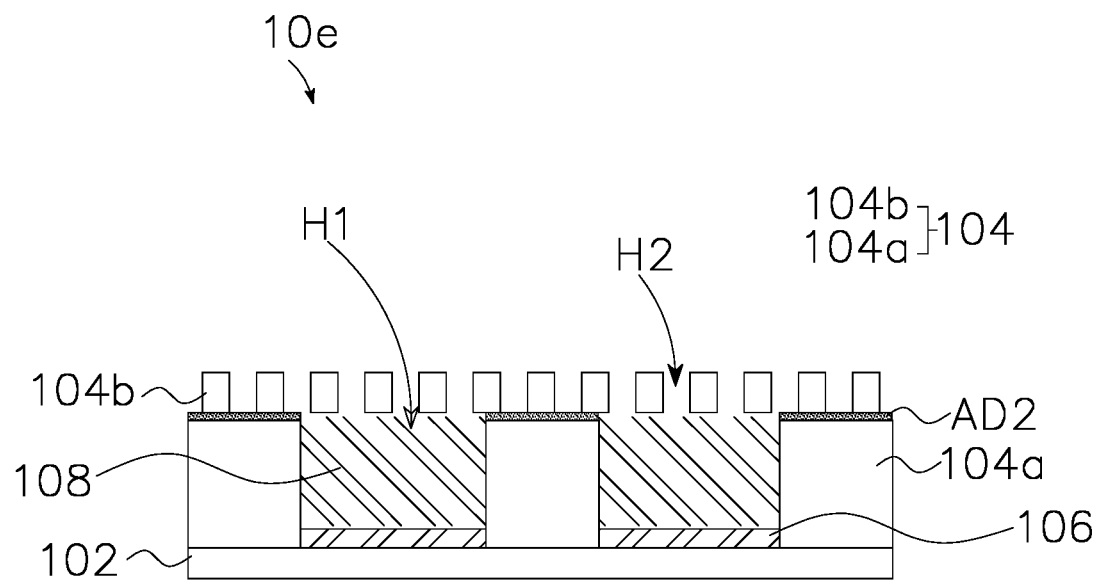
FIG. 5 illustrates a cross-section diagram of the lithium metal electrode of the present invention.

Referring to the FIG. 4, the lithium metal electrode 10d further comprises a first adhesion layer AD1 disposed between the current collector 102 and the insulation layer 104a. The material of the first adhesion layer AD1 is selected from the group consisting of thermal-setting polymer, thermal-plastic polymer and any combinations thereof, wherein the thermal-setting polymer is selected from the group consisting of silicone, epoxy, acrylic acid resin and any combinations thereof and the thermal-plastic polymer is selected from the group consisting of polyethylene, polypropylene, thermal-plastic polyimide, thermal-plastic polyurethane and any combinations thereof. The material of the first adhesion layer AD1 would be better selected from the electrolyte-inert material, such as silicone, polyethylene, polypropylene, thermal-plastic polyimide and so on. Hence, the first adhesion layer AD1 would not react with the electrolyte, especially the liquid-phase electrolyte and/or the gel-phase electrolyte, so that the adhesion ability of the first adhesion layer AD1 would not be reduced. Besides, as the insulation layer 104a and the inhibition layer 104b are not integrated, a second adhesion layer AD2 can be applied between the insulation layer 104a and the inhibition layer 104b, as illustrated in FIG. 5. The material of the second adhesion layer AD2 can be selected from the material mentioned for the first adhesion layer AD1. However, the materials of the insulation layer 104a and the inhibition layer 104b can be not the same practically. In order to make the electrode thinner, the thickness of the first adhesion layer AD1 would be better ranging from 1~30 microns; the thickness of the second adhesion layer AD2 would be better ranging from 1~30 microns as well. Accordingly, the migration distance of the lithium ion inside the electrodes 10d and 10e would not be increased so that the capacity of the battery would not be decreased. Similarly, the material of the second adhesion layer AD2 would be better to choose the material that does not react with the electrolyte, especially the liquid-phase electrolyte and/or the gel-phase electrolyte, so that the second adhesion layer AD2 would not be dissolved, swelled and/or deteriorated.

Figure 6:
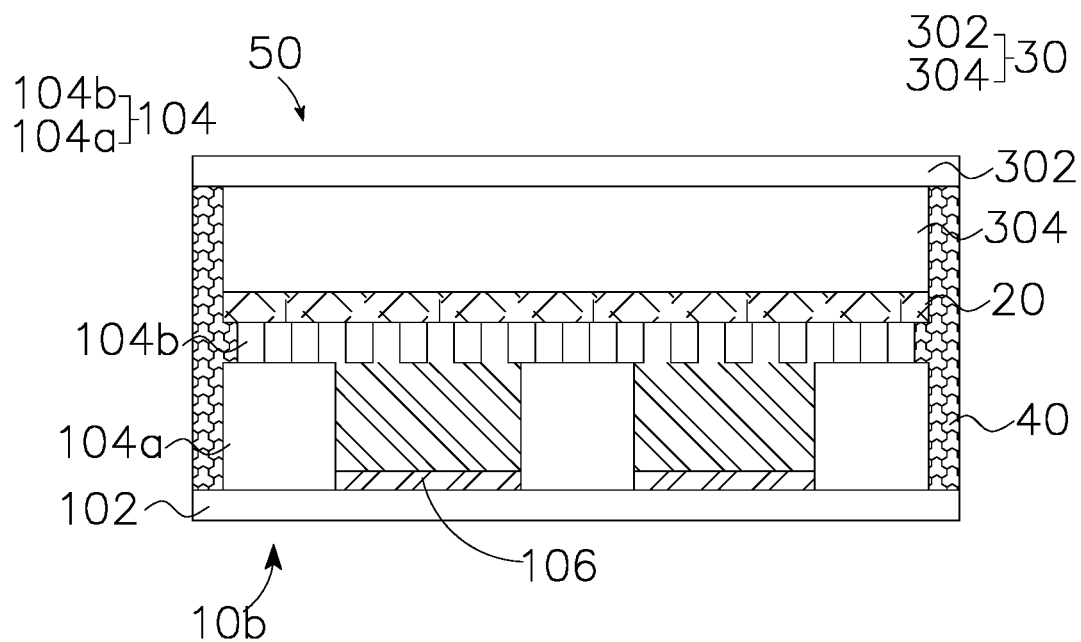
FIG. 6 illustrates a cross-section diagram of the lithium metal battery of the present invention.

In FIG. 6, a lithium metal battery is illustrated. The lithium metal battery 50 comprises a lithium metal electrode 10b, a cathode electrode 30, an electrical insulator 20 and a sealing frame 40. The cathode electrode 30, comprising a second current collector 302 and a cathode active material layer 304, is disposed corresponding to the lithium metal electrode 10b. The electrical insulator 20 is disposed between the cathode electrode 30 and the lithium metal electrode 10b. The sealing frame 40 disposed on an inner periphery alone both of the first current collector 102 of the lithium metal electrode 10b and the second current collector 302 of the cathode electrode 30 for sealing. Most of the sealing frame 40 is disposed orthogonally within a periphery of the lithium metal electrode 10b and/or the cathode electrode 30. That is, most of the sealing frame 40 is disposed on the inner surface of the lithium metal electrode 102 and on the inner surface of the cathode electrode 302 instead of extrudes to the outer periphery of both of the first current collector 102 of the lithium metal electrode 10b and the second current collector 302 of the cathode electrode 30. Of course, the abovementioned is mainly about the most of the sealing frame 40, that is, in certain case, such as the case that the first current collector 102 and the second current collector 302 do not have the same area, some parts of the sealing frame 40 extrudes toward the outer periphery of both of the first current collector 102 of the lithium metal electrode 10b and the second current collector 302 of the cathode electrode 30.

The electrical insulator 20 mentioned above is ionic conductive and can be a polymer separator, a polymer separator having coatings, a ceramic separator or a solid electrolyte. As the electrolyte system of the lithium metal battery 50 has a liquid-phase electrolyte, gel-phase electrolyte or a hybrid-phase electrolyte, the electrical insulator 20 can be selected from the polymer separator, the polymer separator having coatings and/or the ceramic separator. As the electrolyte of the lithium metal battery 50 is solid-phase electrolyte, the electrical insulator 20 can be the solid electrolyte.

The mechanism of the present invention will be disclosed hereinafter. The insulation layer and the inhibition layer are disposed on the current collector in order. The lithium metal layer is disposed on the surface of the current collector exposed according to the first through hole of the insulation layer. The ionic diffusion layer is disposed inside the first through hole. Accordingly, the lithium ions from the electrolyte will migrate through the second through hole of the inhibition layer and approach to the ionic diffusion layer, moistened or stained with the liquid electrolyte and/or the gel electrolyte, inside the first through hole of the insulation layer. The lithium ions can be transferred through the pores formed via the particles and/or fibers of the ionic diffusion layer. In some cases, the lithium ions would plate as a dendrite or form a SEI on the outer surface of the ionic diffusion layer. The lithium dendrite plates and strips inside the pores of the ionic diffusion layer. During plating, the lithium dendrite attaches to the particles and/or the fibers of the ionic diffusion layer to enhance the strength of the solid electrolyte interface (SEI). That is, the surface tension of the SEI is released via attaching well to the ionic diffusion layer so that the SEI become much more stable. Comparing to the SEI's thickness (around 10~50 nanometers), the volume change (15~20 microns) of plating/stripping of the lithium dendrite is too violent and the SEI will be seriously damaged during plating and/or stripping of the lithium dendrite without providing the supporting from the ionic diffusion layer. The ionic diffusion layer having particles and/or the fibers can provide supporting for the SEI to decrease the capacity loss of the battery and even, under certain conditions, can react with the reaction of forming the SEI.

The inhibition layer of the porous electrical insulation layer efficiently inhibits the height of plating of the lithium dendrite during charging due to the structural strength of the inhibition layer. The lithium dendrite will mainly plate horizontally so that the specific regions formed via the insulation layer are highly efficiently used for lithium dendrite plating. Hence, the lithium dendrite will not penetrate through the electrical insulator to avoid inner shorting of the battery. Meanwhile, the lithium dendrite plate toward the radiation direction instead of toward the vertical direction so that the thickness of the battery will not verify extremely.

The surfaces and/or the pores created via the particles and/or fibers of the ionic diffusion layer can serve as the diversions for the liquid and/or gel electrolyte so that the plating/stripping of the lithium dendrite can be more efficient for continuous interface of the electrolyte. Also, the interface between the lithium dendrite and the electrolyte can be kept complete so that the resistance of the interface can be reduced and the uniformity of the lithium dendrite plating can be revealed via controlling the over-voltage of the interface.

Consequently, the insulation layer and the inhibition layer both have enough structural strength to inhibit the forming direction of the lithium dendrite so that Young's modulus of insulation layer and the inhibition layer have to be high enough. Besides, lithium metal electrode become more flexible as the insulation layer has more first through holes; in contrast, the lithium metal electrode become more rigid as the insulation layer has less first through holes.

Comparing to the prior art, the lithium metal electrode and its related lithium metal battery disclosed in the present invention can improve the safety of the battery via the electrical insulated porous electrical insulation layer to inhibit the forming directions and regions of the lithium dendrite.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium metal electrode, comprising:
   a current collector;
   a lithium metal layer that is comprised of primarily lithium metal and that is disposed on at least one exposed portion of one surface of the current collector;
   an ionic diffusion layer that is an ionic diffusion and lithium metal plating layer, that is disposed on and covers the lithium metal layer and that has pores through which lithium ions from the lithium metal layer and an electrolyte pass; and
   a porous electrical insulation layer that comprises:
      an insulation layer that is disposed on the one surface of the current collector in portions thereof without the lithium metal layer, that has at least one first through hole defined therein to expose the at least one exposed portion of the one surface of the current collector, and that completely surrounds sides of the lithium metal layer and sides of the ionic diffusion layer; and
      a porous inhibition layer that inhibits lithium dendrite formation, that is disposed on the insulation layer, and that has a plurality of second through holes defined therein that have respective diameters that are smaller than those of the at least one first through hole and lithium dendrites formed in use, and that are not larger than 1 micrometer.

2. The lithium metal electrode according to claim 1, wherein the current collector is solid or porous.

3. The lithium metal electrode according to claim 1, wherein the insulation layer, the porous inhibition layer or both the insulation layer and the porous inhibition layer are comprised of a material that is selected from the group consisting of an insulation polymer material, an insulation ceramic material, an insulation glass material, an insulation glass fiber material and any combination thereof.

4. The lithium metal electrode according to claim 1, wherein the insulation layer has an aperture ratio that ranges from 40% to 99.5%.

5. The lithium metal electrode according to claim 1, wherein the at least one first through hole is a plurality of first through holes.

6. The lithium metal electrode according to claim 5, wherein the plurality of first through holes have respective diameters that are not less than 50 micrometers.

7. The lithium metal electrode according to claim 1, wherein the porous inhibition layer has an aperture ratio that ranges from 25% to 80%.

8. The lithium metal electrode according to claim 1, wherein the porous electrical insulation layer has a thickness that ranges from 16 to 65 micrometers.

9. The lithium metal electrode according to claim 1, wherein the insulation layer has a thickness that ranges from 15 to 40 micrometers.

10. The lithium metal electrode according to claim 1, wherein the porous inhibition layer has a thickness that ranges from 1 to 25 micrometers.

11. The lithium metal electrode according to claim 1, wherein the lithium metal layer has a thickness that ranges from 0.3 to 5 micrometers.

12. The lithium metal electrode according to claim 1, wherein a first adhesion layer is provided between the current collector and the insulation layer.

13. The lithium metal electrode according to claim 12, wherein the first adhesion layer has a thickness that ranges from 1 to 30 micrometers.

14. The lithium metal electrode according to claim 1, wherein a second adhesion layer is provided between the insulation layer and the porous inhibition layer.

15. The lithium metal electrode according to claim 14, wherein the second adhesion layer has a thickness that ranges from 1 to 30 micrometers.

16. The lithium metal electrode according to claim 1, wherein the ionic diffusion layer has a charged surface that is a treated surface that carries anions, cations, or anions and cations.

17. A lithium metal battery, comprising:
   a lithium metal electrode, comprising:
      a first current collector;
      a lithium metal layer that is comprised of primarily lithium metal and that is disposed on at least one exposed portion of one surface of the current collector;
      an ionic diffusion layer, that is an ionic diffusion and lithium metal plating layer, that is disposed on and covers the lithium metal layer and through which lithium ions from the lithium metal layer and an electrolyte pass; and
      a porous electrical insulation layer that inhibits forming directions and regions of lithium dendrites that form in use and that comprises:
         an insulation layer that is disposed on the one surface of the first current collector in portions thereof without the lithium metal layer, that has at least one first through hole defined therein to expose the at least one exposed portion of the one surface of the first current collector, and that completely surrounds sides of the lithium metal layer and sides of the ionic diffusion layer; and
         a porous inhibition layer that inhibits lithium dendrite formation, that is disposed on the insulation layer, and that has a plurality of second through holes defined therein that have respective diameters that are smaller than those of the at least one first through hole and lithium dendrites formed in use, and that are not larger than 1 micrometer;
   a cathode electrode that is disposed in correspondence with the lithium metal electrode and that has a second current collector and a cathode active material layer;
   an electrical insulator that is disposed between the cathode electrode and the lithium metal electrode and that has at least an electrolyte; and a sealing frame that is disposed on an inner periphery along the first current collector of the lithium metal electrode and either the second current collector or the cathode electrode for sealing the lithium metal battery, wherein the ionic diffusion layer is made of particles, fibers, or particles and fibers onto which lithium dendrites formed in use are attached and enhance strength of a solid electrolyte interface (SEI), wherein the ionic diffusion layer is positioned entirely within the insulation layer and does not penetrate into the porous inhibition layer, and wherein the ionic diffusion layer has a charged surface.

18. The lithium metal battery according to claim 17, wherein the electrical insulator is ionically conductive and is a polymer separator, a polymer separator having coatings, a ceramic separator or a solid electrolyte.

19. The lithium metal battery according to claim 17, wherein the sealing frame is located within an edge of the lithium metal electrode, the cathode electrode, or the lithium metal electrode and the cathode electrode.

* * * * *